United States Patent
Lu et al.

(10) Patent No.: US 10,684,882 B2
(45) Date of Patent: *Jun. 16, 2020

(54) UPDATING NETWORKS WITH MIGRATION INFORMATION FOR A VIRTUAL MACHINE

(71) Applicant: INTERNATIONAL BUSINESS MACHINES CORPORATION, Armonk, NY (US)

(72) Inventors: Jing Lu, Wuxi (CN); Heng Guo Ge, Wuxi (CN); Da Shen, Wuxi (CN); Jun Yao, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/855,342

(22) Filed: Dec. 27, 2017

(65) Prior Publication Data

US 2018/0121233 A1  May 3, 2018

Related U.S. Application Data

(63) Continuation of application No. 14/722,451, filed on May 27, 2015, now Pat. No. 9,916,174.

(51) Int. Cl.
*G06F 9/455* (2018.01)
*H04L 12/707* (2013.01)

(52) U.S. Cl.
CPC .......... *G06F 9/45558* (2013.01); *H04L 45/22* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| 9,916,174 B2 | 3/2018 | Lu |
| 2010/0274890 A1 | 10/2010 | Patel |

(Continued)

FOREIGN PATENT DOCUMENTS

| CN | 102821023 A | 12/2012 |
| CN | 103200069 | 7/2013 |

(Continued)

OTHER PUBLICATIONS

Network Virtualization, Fast VM Moving Swithover in NVO3 Network, Aug. 10, 2014, NetworkingOpen.com, http://www.networkingopen.com/2014/08/fast-vm-moving-switchover-in-nvo3-network/.

(Continued)

*Primary Examiner* — Bradley A Teets
(74) *Attorney, Agent, or Firm* — Isaac J. Gooshaw, Esq.; George S. Blasiak, Esq.; Heslin Rothenberg Farley & Mesiti PC

(57) ABSTRACT

Methods, computer program products, and network authority devices are presented. The methods include, for instance: updating a source network with migration information of a virtual machine to redirect network traffic for the virtual machine to a destination network; and updating at least one remote network with the migration information of the virtual machine. In one embodiment, the updating includes updating the source network concurrent with a migration of the virtual machine to minimize interruption of the network traffic. In another embodiment, the updating includes updating a network device of the source network to forward the network traffic for the virtual machine to another network device of the destination network. In a further embodiment, the updating includes updating the source network to redirect the network traffic from at least one client on the at least one remote network.

20 Claims, 9 Drawing Sheets

(56) References Cited

U.S. PATENT DOCUMENTS

| | | | |
|---|---|---|---|
| 2010/0287548 A1* | 11/2010 | Zhou | G06F 9/4856 718/1 |
| 2012/0102156 A1 | 4/2012 | Kang et al. | |
| 2012/0173757 A1 | 7/2012 | Sanden | |
| 2012/0278804 A1 | 11/2012 | Narayanasamy | |
| 2013/0031544 A1 | 1/2013 | Sridharan | |
| 2013/0238802 A1 | 9/2013 | Sarikaya | |
| 2013/0318219 A1 | 11/2013 | Kancherla | |
| 2014/0006585 A1 | 1/2014 | Dunbar et al. | |
| 2014/0086253 A1 | 3/2014 | Yong | |
| 2015/0033220 A1 | 1/2015 | Venkat et al. | |
| 2015/0142938 A1* | 5/2015 | Koponen | H04L 41/0823 709/222 |
| 2015/0148938 A1 | 5/2015 | Koponen | |
| 2015/0149999 A1 | 5/2015 | Fiamanathan | |
| 2016/0026506 A1 | 1/2016 | Jiang | |

FOREIGN PATENT DOCUMENTS

| | | |
|---|---|---|
| CN | 104407911 A | 3/2015 |
| CN | 104780109 A | 7/2015 |
| WO | WO2014075527 A1 | 5/2014 |

OTHER PUBLICATIONS

Security Requirements of NVO3, draft-ietf-nvo3-security-requirements-00, Hartman, et al., Sep. 29, 2013.

Mobility and Interconnection of Virtual Machines and Virtual Network Elements, draft-khasnabish-vmmi-problems-03.txt, Khasnabish, et al., Dec. 30, 2012.

NVO3 Operations, Administration, and Maintenance Requirements, draft-ashwood-nvo3-oam-requirements-01, Ashwood-Smith, et al., Jun. 15, 2014.

National Institute of Standards and Technology, U.S. Department of Commerce, The NIST Definition of Cloud Computing, Recommendations of the National Institute of Standards and Technology, Special Publication 800-145, Computer Security, Mell, et al., Sep. 2011.

Framework of Supporting Applications Specific Multicast in NVO3, draft-ghanwani-nvo3-app-mcast-framework-01, Ghanwani, et al. Dec. 8, 2014.

Virtual Network Auto-Provisioning Requirements, draft-gu-nvo3-auto-provisioning-reqs-00.txt, Gu, et al., Jul. 4, 2014.

NVE Auto-Discovery Protocol, draft-gu-nvo3-virt-edge-auto-discovery-00.txt, Gu, et al., Jul. 4, 2014.

NVO3 Anycast Layer 3 Gateway, draft-hao-nvo3-anycast-gw.00.txt, Hao, et al., Jun. 30, 2014.

Network as a Service Architecture, draft-liu-nvo3-naas-arch-01, Liu, et al., Jun. 30, 2014.

Problem Statement of VxLAN Performance Test, draft-liu-nvo3-ps-vxlan-performance-00.txt, Liu, et al., Jul. 3, 2014.

NVO3 VDP Gap Analysis—VM-to-NVE Specific Control-Plane Requirements, draft-pt-nvo3-vdp-vm2nve-gap-analysis-00.txt, Pelissier, et al., Jun. 18, 2014.

Generic Protocol Extension for VXLAN, draft-quinn-vxlan-gpe-03.txt, Quinn, et al., Jul. 3, 2014.

Yang Data Model for NVO3 Operations, Administration, and Maintenance (OAM), draft-tissa-nvo3-yang-oam-00.txt, Senevirathne, et al., Jun. 10, 2014.

Layer 2 Gateway (L2GW), draft-xia-nvo3-l2gw-02, Xia, et al., Oct. 27, 2014.

Detecting NVO3 Overlay Point-to-Multipoint Data Plane failures, draft-xia-nvo3-overlay-p2mp-ping-00, Xia, et al., May 21, 2014.

Network Virtualization Edge (NVE), draft-yong-nvo3-nve-04, Yong, et al., Jun. 18, 2014.

List of IBM Patent and/or Patent Applications treated as related for U.S. Appl. No. 15/855,342, filed Dec. 27, 2017, dated Aug. 1, 2018.

International Search Report of the International Searching Authority for International Application No. PCT/CN2016/083396, dated Jul. 26, 2016.

Written Opinion of the International Searching Authority for International Application No. PCT/CN2016/083396, dated Jul. 26, 2016.

* cited by examiner

UPDATING NETWORKS WITH MIGRATION INFORMATION FOR A VIRTUAL MACHINE

CROSS-REFERENCE TO RELATED APPLICATION

This application is a continuation of U.S. patent application Ser. No. 14/722,451, filed May 27, 2015, entitled, "Updating Networks with Migration Information for a Virtual Machine," the entirety of which is hereby incorporated herein by reference.

TECHNICAL FIELD

The present disclosure relates to virtualization technologies, including virtual networking and virtual computing, and more particularly to updating networks with migration information of a virtual machine.

BACKGROUND

By way of background, as demand continues for high capacity distributed data centers, virtualization technologies, including the use of virtual machines and software defined networking, have been leveraged to provide increased scalability and enhanced performance of network and computer resources. For instance, virtualization of resources, such as network, computer, and storage resources, allows abstraction of physical resources into logical representations, providing for flexibility in the provisioning and management of services and hardware infrastructure. In addition, virtualization can enable the deployment of multi-tenant data center infrastructures, in which multiple independent customer domains can be hosted using a single set of physical resources. In addition, virtualization can allow for virtual machines, such as virtual servers or clients, to be deployed with variable levels of computer resources, which can be increased or decreased as needed. Further, virtualization can allow for virtual machines to be migrated from one location to another location. In particular, in one example, a virtual machine can be migrated from one data center to another data center, for example, to allow for maintenance of the one data center without interrupting client sessions with the virtual machine. In another example, a virtual machine can be migrated from one physical server to another physical server within a data center, in order to provide increased resources needed by the virtual machine during a time period in which the volume of client network traffic or client demand for virtual machine processing resources increases.

However, some of the features that make virtualization technologies attractive can lead to problems, because underlying physical resources, such as computers and network devices, can be harder to manage and track when services and software are virtualized, because the physical locations are decoupled from the virtual locations. For example, networks and applications designed to operate in a single geographically centralized data center can behave differently when their components are spread across a geographically diverse virtual environment. In such a case, technological issues can arise with the computer technologies, such as loss or delay of network or server traffic.

In one particular example, underlying networking technologies, such as Transmission Control Protocol/Internet Protocol (TCP/IP), include features by which a client/server session may be restored after interruption, such as the migration of the server from one network location to another network location. For example, a timeout window, which may be on the order of minutes, is typically set. In such a case, if clients fail to receive responses from the server within the timeout window, each client can abort its TCP/IP session and initiate a new TCP/IP session to the server. Because TCP/IP technology does not contemplate the relocation of a server from one network to another network, this timeout window simply leads to disconnection of each and every single client of the server, followed by a mass attempt for each client to reconnect to the server. Meanwhile, all state information maintained by the server for the client has been lost, and business transactions that were previously in progress have been terminated. Therefore, a need exists for technological solutions to enhance and improve the functioning of virtualized technologies when, for example, virtual machines are migrated over a software defined network.

SUMMARY

Shortcomings of the prior art are overcome and additional advantages are provided through the provision, in one aspect, of a method. The method includes: updating a source network with migration information of a virtual machine to redirect network traffic for the virtual machine to a destination network; and providing at least one remote network with virtual machine migration information. For example, the method can allow for faster restoration of network traffic after migration of a virtual machine.

In one embodiment, the updating includes updating the source network concurrent with a migration of the virtual machine to minimize interruption of the network traffic. For example, the updating can maximize connectivity of clients and the virtual machine.

In another embodiment, the updating includes updating a network device of the source network to forward the network traffic for the virtual machine to another network device of the destination network. For example, forwarding functions of the network device of the source network can be leveraged during migration of the virtual machine.

In another embodiment, updating the source network to redirect the network traffic from at least one client on the at least one remote network. For example, the network traffic from at least one client can be maintained and forwarded to the virtual machine.

In another embodiment, the method can further include provisioning, by the one or more processor, the destination network with the migration information of the virtual machine to direct outgoing network traffic from the virtual machine to the at least one remote network. For example, the destination network can be updated so that disruption of network traffic from the virtual machine to at least one remote network is minimized during the migration.

In another embodiment, the updating includes updating a network device of the source network with routing information. For example, updating the network device of the source network with the routing information can enable forwarding network traffic to the virtual machine.

In another embodiment, the providing includes providing a network device of the remote network with routing information. For example, providing the network device of the remote network with the routing information can enable forwarding the network traffic from the virtual machine to clients thereof.

In another embodiment, the providing includes providing the at least one remote network with virtual machine migration information within a pre-determined time interval, where the pre-determined time interval is selected to minimize the redirecting of network traffic by the source network. For example, by minimizing the amount of time that the network traffic must be redirected by the source network, additional burden on the resources of network devices of the source network may be mitigated or alleviated.

In another aspect, a computer program product is provided. The computer program product includes: a computer readable storage medium readable by one or more processor and storing instructions for execution by the one or more one processor for performing a method including: updating, by the one or more processor, a source network with migration information of a virtual machine to redirect network traffic for the virtual machine to a destination network; and providing at least one remote network with virtual machine migration information. For example, the computer program product can allow for faster restoration of network traffic after migration of a virtual machine.

In a further aspect, a network authority device is provided. The network authority device includes: a memory; and one or more processor in communication with the memory, where the network device is configured to perform a method, the method including: updating, by the one or more processor, a source network with migration information of a virtual machine to redirect network traffic for the virtual machine to a destination network; and providing at least one remote network with virtual machine migration information. For example, the network authority device can provide for centralized control and management of a software defined network.

Additional features and advantages are realized through the techniques set forth herein. Other embodiments and aspects are described in detail herein and are considered a part of the claimed disclosure.

BRIEF DESCRIPTION OF THE DRAWINGS

One or more aspects of the present disclosure are particularly pointed out and distinctly claimed as examples in the claims at the conclusion of the specification. The foregoing and other objects, features, and advantages of the present disclosure are apparent from the following detailed description taken in conjunction with the accompanying drawings in which:

DETAILED DESCRIPTION

Figure 1:
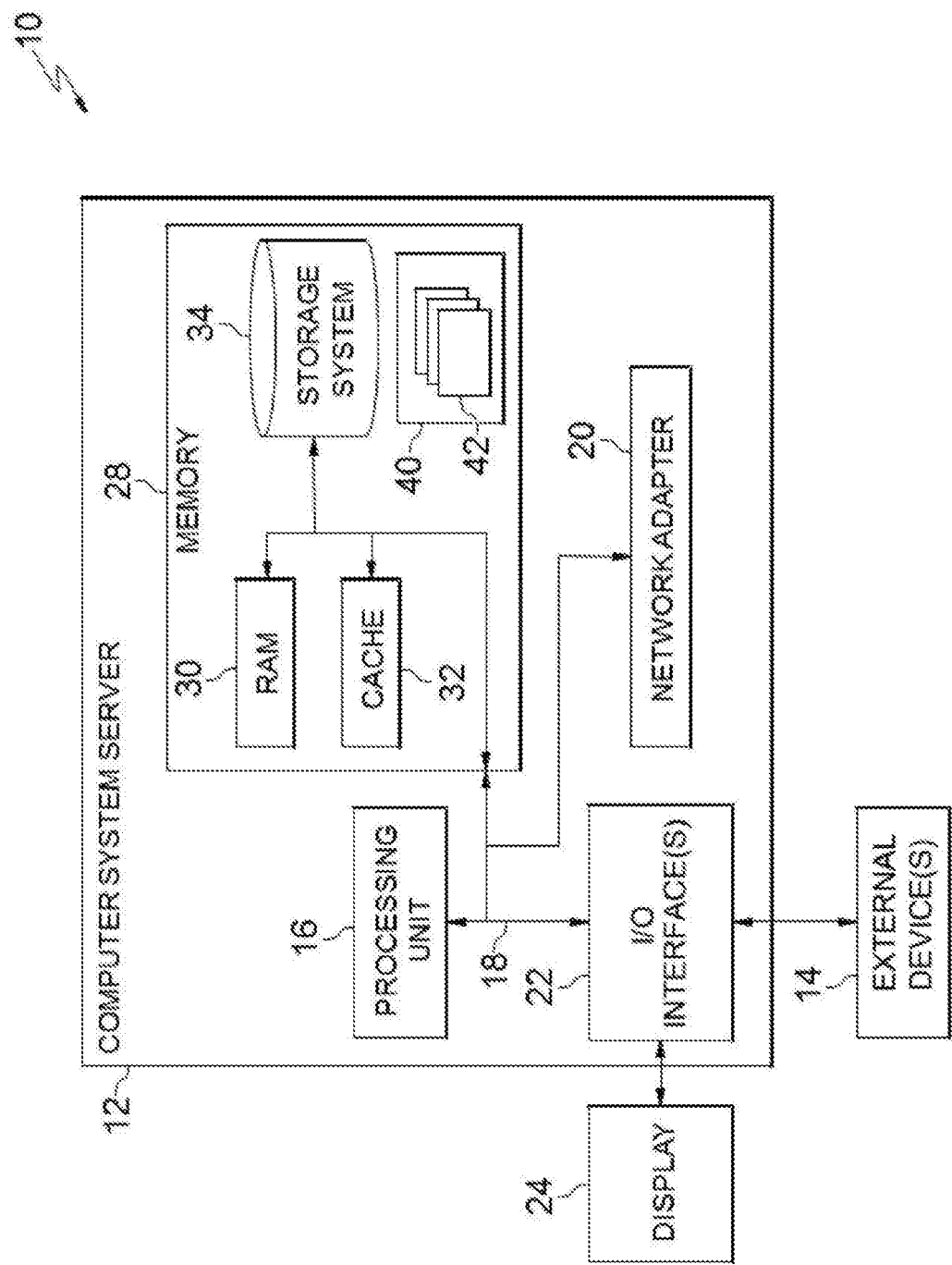
FIG. 1 depicts a cloud computing node, in accordance with one or more aspects set forth herein.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects described herein, are given by way of illustration only, and not by way of limitation. Various substitutions, modifications, additions, and/or arrangements, within the spirit and/or scope of the underlying concepts will be apparent to those skilled in the art from this disclosure.

The present disclosure provides, in part, methods, computer programs, computer systems, and/or network devices for updating and/or providing networks, for instance, with information related to migration of virtual machines. Demand continues for virtualization technologies, including networks and computers for data center applications. The abstraction of physical resources into logical representations, advantageously provided by virtualization technologies, can be leveraged to enable sophisticated, enhanced technology solutions.

For instance, virtualization can enable the deployment of multi-tenant data center infrastructures, in which multiple independent customer domains can be hosted using a single set of physical resources. In addition, a service provider can offer distributed data center services to numerous customers or tenants, and use virtualization technologies to allow, for instance, server applications for the numerous customers to operate on the same physical infrastructure without exposing one customer's network traffic or server data to another customer.

Further, virtualization technology can also include the use of virtual machines, which are abstractions of hardware or physical computers implemented in software. A virtual machine may be viewed as a software computer that, like a hardware computer, has an operating system, can run applications, and has access to devices and resources. For example, a virtual machine can be migrated from one physical hardware infrastructure to another physical hardware infrastructure within a data center location or in another data center location.

Advantageously, the techniques presented herein provide enhanced techniques for operating, maintaining, and/or managing virtualization technologies.

Reference is made below to the drawings, which are not drawn to scale for ease of understanding, wherein the same reference numbers used throughout different figures designate the same or similar components.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
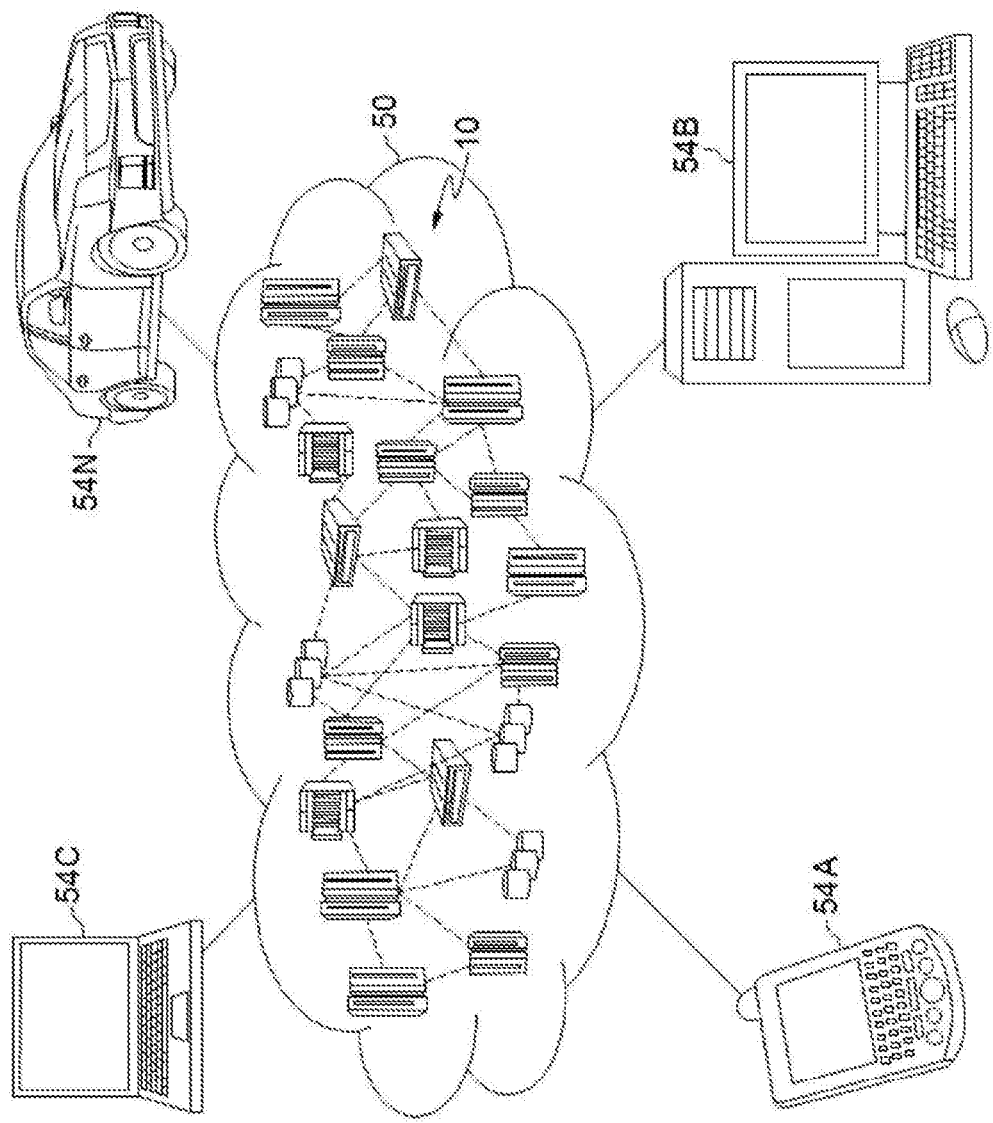
FIG. 2 depicts a cloud computing environment, in accordance with one or more aspects set forth herein.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
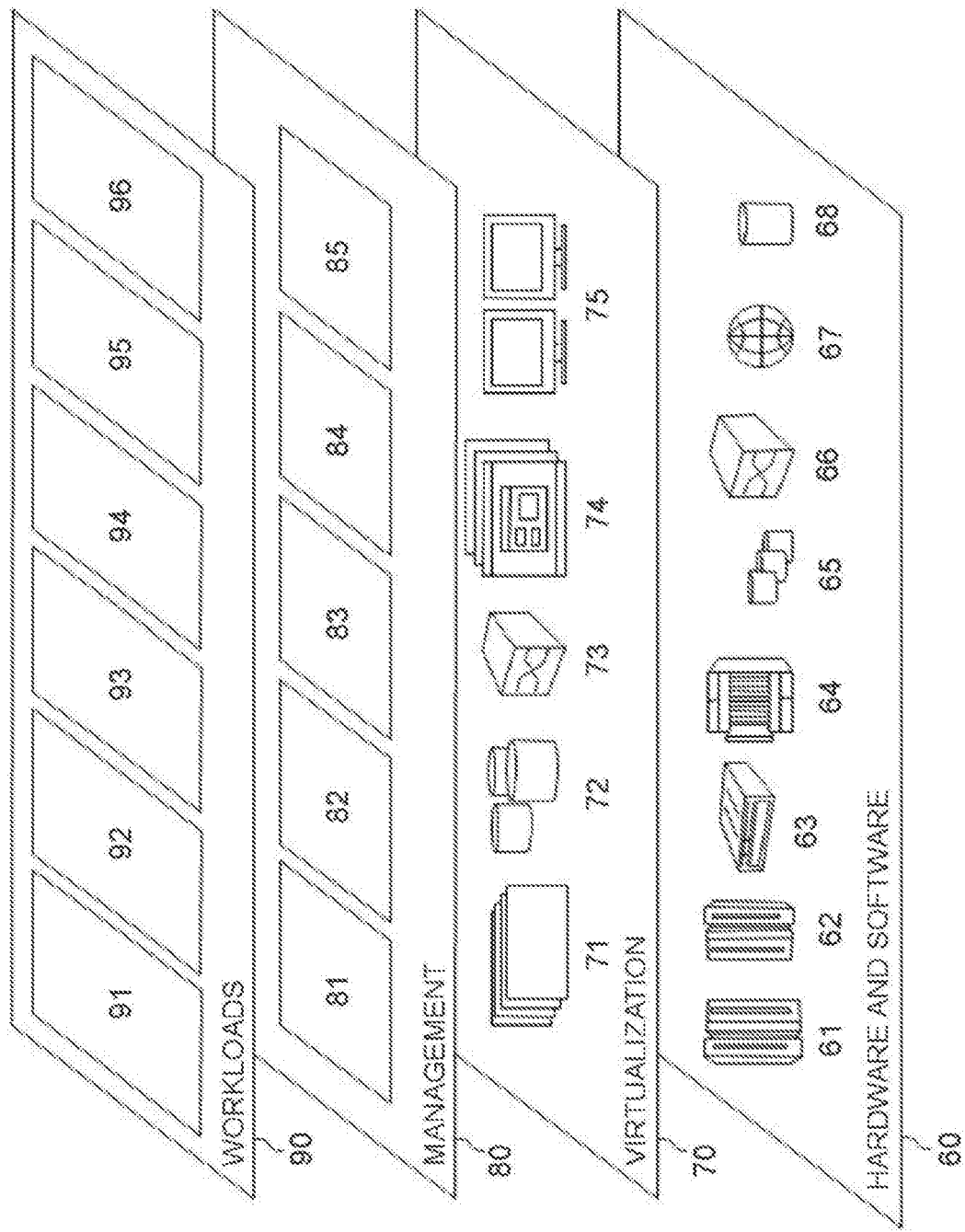
FIG. 3 depicts abstraction model layers, in accordance with one or more aspects set forth herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and updating networks with migration information of virtual machines 96 as described herein.

Figure 4:
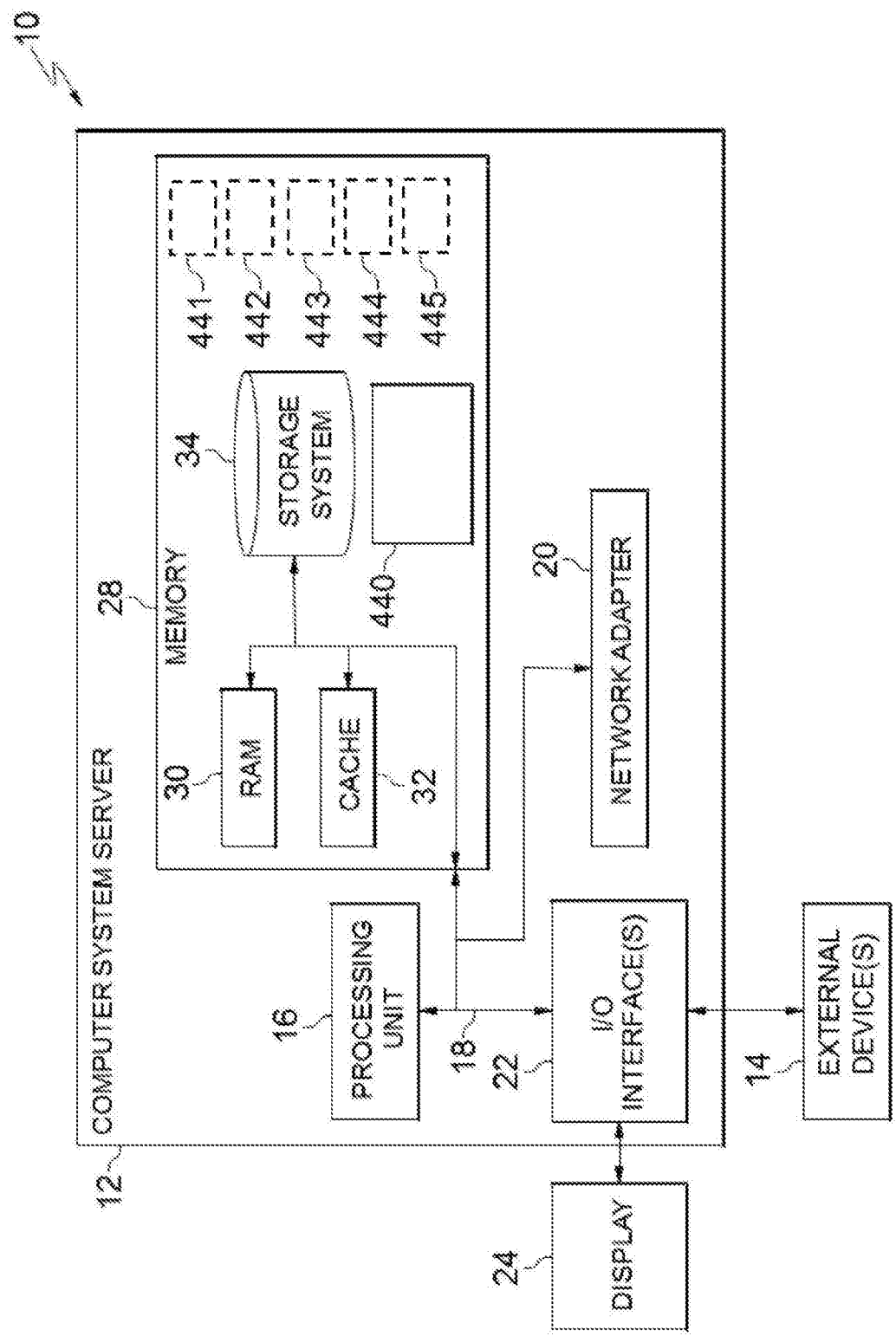
FIG. 4 depicts a hardware overview of a computing node, in accordance with one or more aspects set forth herein.

FIG. 4 depicts a hardware overview of a computing node 10, which may be a cloud computing node, a network device 120, 120-1, 120-2, 120-3 (FIG. 5), a network authority device 125 (FIG. 5), and/or a computing node 130-1, 130-2, 130-3 (FIG. 5), in accordance with one or more aspects set forth herein.

Figure 5:
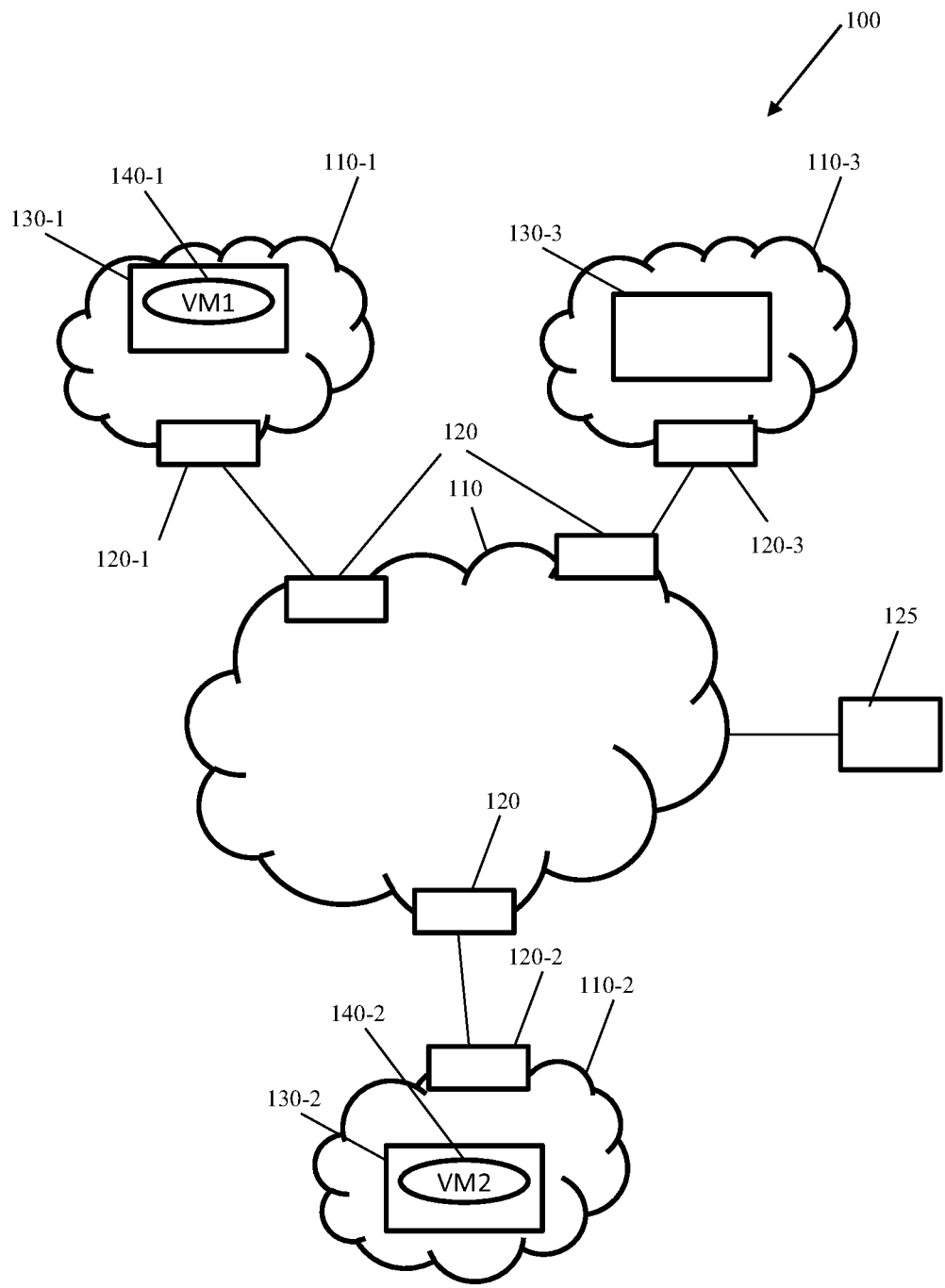
FIG. 5 is an exemplary block diagram of a system, in accordance with one or more aspects set forth herein.

Program/utility 40 as set forth in FIG. 1 can include one or more program 440 as set forth in FIG. 4, and program/utility 40 as set forth in FIG. 5 can optionally include some or all of one or more program 441, 442, 443, 444, 445.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441, 442, 443, 444, 445) generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 5 is an exemplary block diagram of a system 100, in accordance with one or more aspects set forth herein. In the embodiment of FIG. 5, system 100 includes numerous networks 110, which may be physical networks or virtual networks. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

In one embodiment, a network, e.g., a network 110, 110-1, 110-2, 110-3, connects to one or more network devices, e.g., network devices 120, 120-1, 120-2, 120-3, and one or more computing nodes, e.g., computing nodes 130-1, 130-2, 130-3. For example, network device 120 can be a network edge device, such as a network switch or network router, and can operate at one or more network protocol layers, such as layer 2 (L2), layer 3 (L3), or layers 4-7 (L4-L7). In another example, network device 120 can combine the features of network switches and network routers. In general, each of network device 120, 120-1, 120-2, 120-3 and computing node 130-1, 130-2, 130-3 can be or include a computing node 10 (FIG. 4), details of which are described below.

In one embodiment, a network authority device 125 can be included, so that control plane information between network devices 120 may be communicated. In one example, network authority device 125 can be one of the network devices 120 provisioned with software to perform the functions noted below with respect to network authority device 125. In the embodiment of FIG. 5, network authority device 125 is shown as a separate device.

In one embodiment, computing nodes 130-1, 130-2, 130-3 can each have one or more virtual machines, e.g., virtual machines 140-1, 140-2. For example, a virtual machine 140-1 is a software computer that can run an operating system and applications, and can have access to virtual devices. In addition, a virtual machine can include more than one physical machine, and numerous virtual machines can exist one the same set of physical machines. From the standpoint of a client, such as another virtual machine or physical machine, communication and interaction with a virtual machine proceeds just as with physical machines.

Continuing with reference to the embodiment of FIG. 5, a virtual machine VM1 can establish communication with a virtual machine VM2. For example, virtual machine VM1 can be located on network 110-1 and virtual machine VM2 can be located on network 110-2. In addition, physical communication can take place using underlying physical network devices 120-1, 120-2.

By way of background, in one example technological process, virtual machine VM1 can be migrated from source network 110-1 to destination network 110-3. In such a case, the migration can interrupt the flow of network traffic between virtual machine VM1 and virtual machine VM2. For instance, after migration, a destination host on network 110-3 can send a reverse address resolution protocol (RARP) message or packet informing other network peers of the migration. In such a case, network devices can, in response to receipt of the RARP message, update a forwarding database for routing, so that traffic can be routed. Advantageously, the present disclosure provides techniques to update the networks of the migration information in such a way as to minimize interruption to network traffic.

Figure 6:
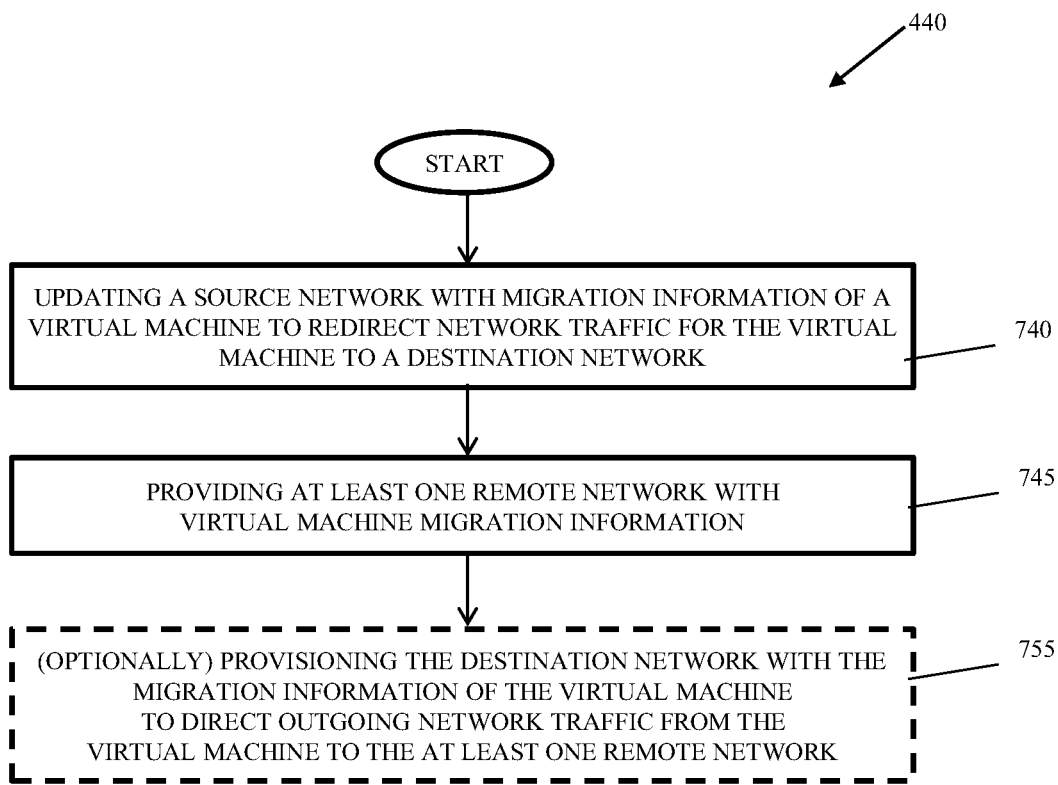
FIG. 6 depicts embodiments of processes for updating networks, in accordance with one or more aspects set forth herein.

FIG. 6 depicts embodiments of processes for updating networks, in accordance with one or more aspects set forth herein. By way of example, the processes described with respect to FIG. 6 can be performed using one or more program 440 on one or more network authority device 125 (FIG. 5), as detailed with respect to FIG. 4.

In the embodiment of FIG. 6, one or more program 440 at block 740 updates a source network with migration information of a virtual machine to redirect network traffic for the virtual machine to a destination network; and one or more program 440 at block 745 provides at least one remote network with virtual machine migration information. For instance, one or more program 440 at block 740 can update the source network with first information and one or more program 440 at block 745 can provide the at least one remote network with second information. In addition, in one example, the first and second information can be the same information. In another example, the first and second information can be different information. In particular, the first information can be a subset or superset of the second information. Such a configuration allows updating the source network with appropriate information for the source network to redirect network traffic, such as L2 and L3 network addresses, and provide the at least one remote network with different appropriate information, such as only L2 or L3 network addresses.

In one embodiment, one or more program 440 at block 740 updates the source network concurrent with a migration of the virtual machine to minimize interruption of the network traffic. In another embodiment, one or more program 440 at block 740 updates a network device of the source network to forward the network traffic for the virtual machine to another network device of the destination network. In a further embodiment, one or more program 440 at block 740 updates the source network to redirect the network traffic from at least one client on the at least one remote network.

In the embodiment of FIG. 6, one or more program 440 at block 755 provisions the destination network with the migration information of the virtual machine to direct outgoing network traffic from the virtual machine to the at least one remote network. In particular, directing network traffic can include sending network traffic from the virtual machine to remote network(s) for remote virtual machine(s) located thereon or receiving network traffic from remote virtual machine(s) on remote network(s) and sending such traffic to the virtual machine. In another embodiment, one or more program 440 at block 740 updates a network device of the source network with routing information. In another embodiment, one or more program 440 at block 745 provides a network device of the remote network with routing information. In a further embodiment, one or more program 440 at block 745 provides the at least one remote network with virtual machine migration information within a pre-determined time interval, where the pre-determined time interval is selected to minimize the redirecting of network traffic by the source network.

In one embodiment, one or more program 440 at block 740 updates the source network by sending a network message from the network authority device to an edge network device on the source network, and the source network receives and processes the network message. In another embodiment, one or more program 440 at block 740 updates the source network by using a routing protocol to attach another header to the packet of the network stream, such as by pushing a multiprotocol label switching (MPLS) header onto the existing header stack of the packet of the network stream. In a further embodiment, one or more program 440 at block 740 updates the source network through a control plane that is logically separated from the data plane, so that control data and network traffic data are not intermingled.

In one embodiment, one or more program 440 at block 740 updates the source network with information that includes a layer 2 address, such as a media access control address or a multiprotocol label switching label. In another embodiment, one or more program 440 at block 740 updates the source network with information that includes a layer 3 address, such as an internet protocol address. In another embodiment, one or more program 440 at block 740 updates the source network with information that includes an application address, such as a layer 4-7 address. In a further embodiment, one or more program 440 at block 740 updates the source network by reconfiguring a network device of the source network to accomplish forwarding of network traffic destined for the virtual machine to the destination network.

In one embodiment, one or more program 440 at block 740 updates the source network with information of multiple virtual machines that have been migrated during a specific time frame, so that redirection of network traffic can be accomplished for all such virtual machines. In another embodiment, one or more program 440 at block 740 updates the source network in advance of a migration, by telling the source network, or a network device therein, to begin redirecting network traffic upon the completion of some future condition, such as the expiration of a predetermined time interval, or the detection of certain network traffic. In a further embodiment, one or more program 440 at block 740 updates the destination network using in-band messaging, in order to minimize network complexity.

In one embodiment, one or more program 440 at block 745 provides the source network with information that includes a layer 2 address, such as a media access control address or a multiprotocol label switching label. In another embodiment, one or more program 440 at block 745 provides the source network with information that includes a layer 3 address, such as an internet protocol address. In another embodiment, one or more program 440 at block 745 provides the source network with information that includes an application address, such as a layer 4-7 address. In a further embodiment, one or more program 440 at block 745 provides the source network by reconfiguring a network device of the source network to accomplish forwarding of network traffic destined for the virtual machine to the destination network.

In one embodiment, one or more program 440 at block 745 provides multiple remote networks with virtual machine migration information. In such a case, one or more program 440 at block 745 can provide the information to each client that is currently connected to the virtual machine and for which a seamless transition is desired, during which time network traffic interruption between the client and the virtual machine can be mitigated. In another embodiment, one or more program 440 at block 745 provides virtual machine migration information to a limited subset of connected clients, and allows other clients to drop traffic and potentially reconnect after timing out.

In different embodiments, the different blocks of one or more program 440 can run on the same or different set of processor(s), which can be located on various physical and/or virtual machines. For example, a first block can run on one processor, and a second block can run on a different processor.

Figure 7A:
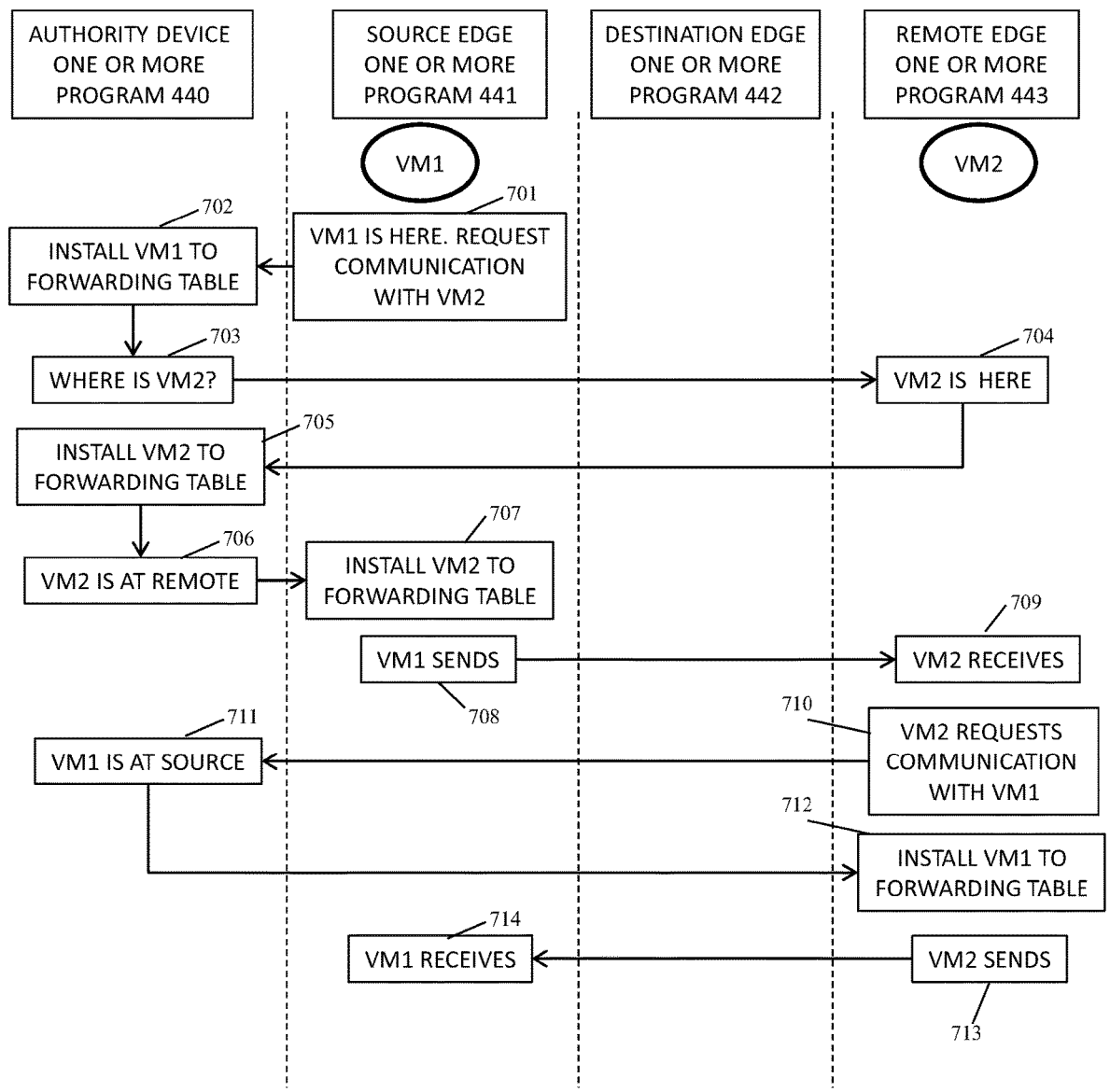
FIGS. 7A-7C are diagrams illustrating further aspects of processes for updating networks, in accordance with one or more aspects set forth herein.
Figure 7B:
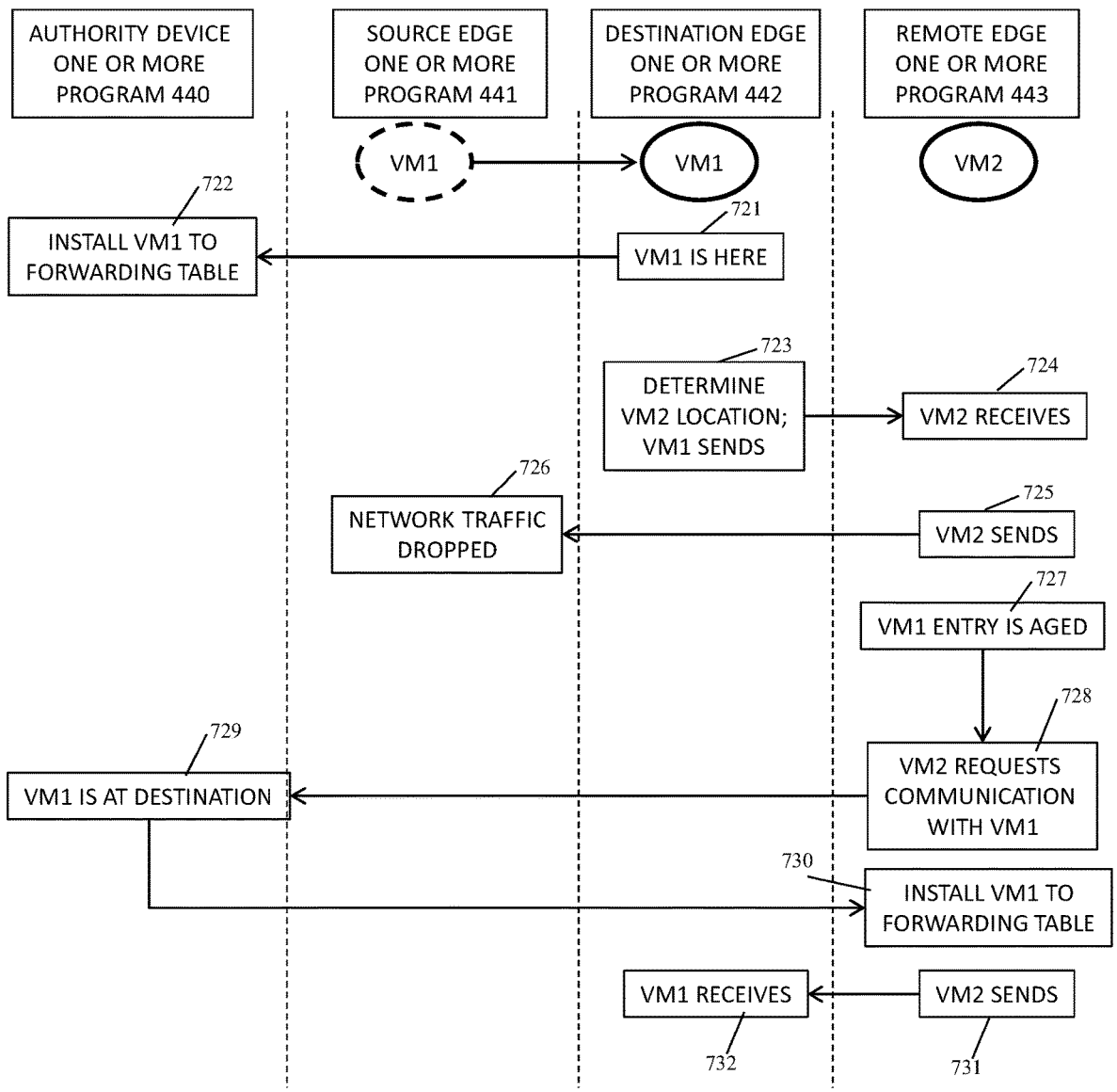
Figure 7C:
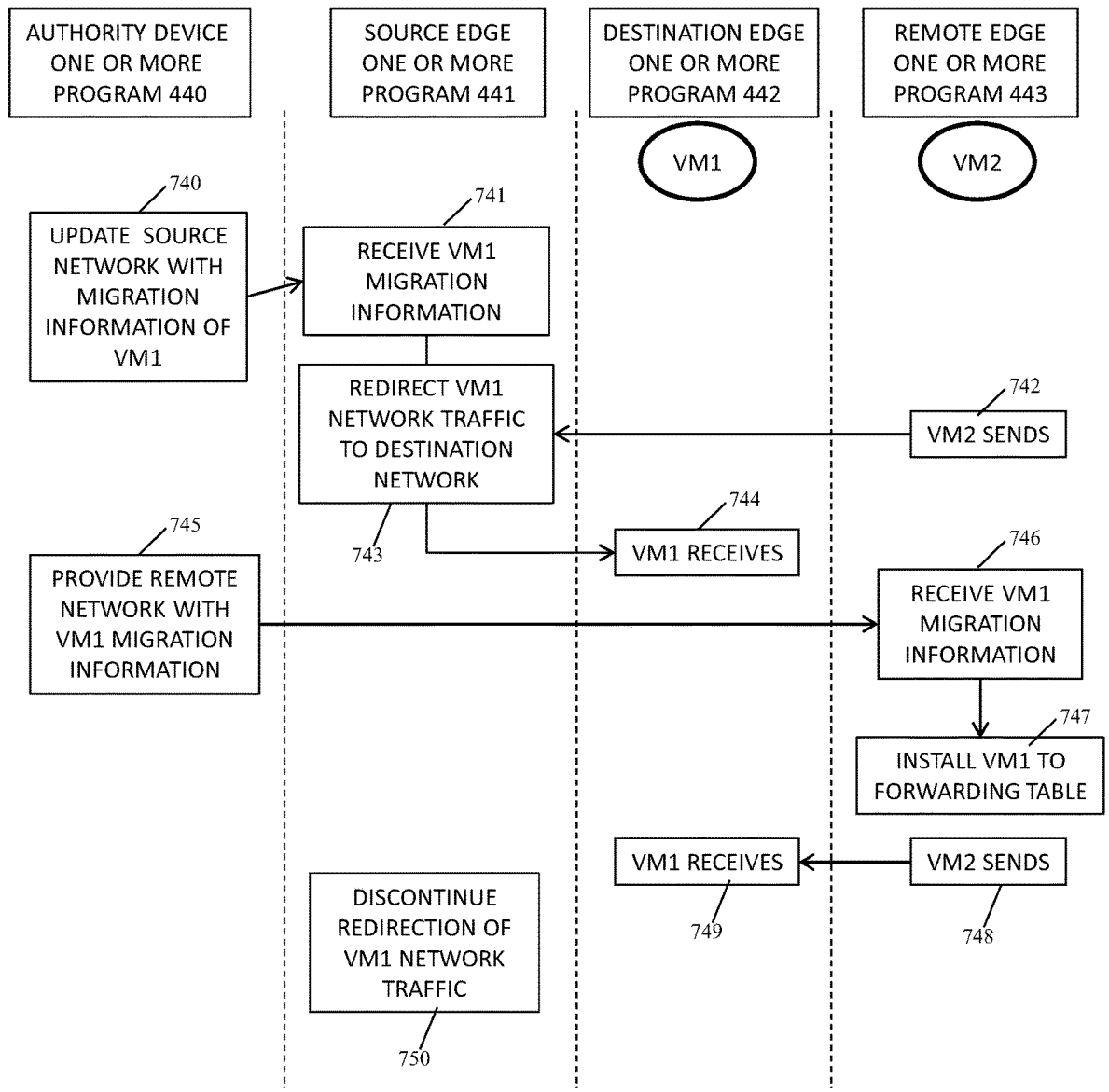

FIGS. 7A-7C are diagrams illustrating further aspects of processes for updating networks, in accordance with one or more aspects set forth herein.

The embodiments of FIGS. 7A-7C may be used to understand certain problems that can arise when virtual machines are migrated in a virtual networking environment, and will explain how the techniques disclosed herein may be used to overcome such problems. As will be explained below, these problems can lead to loss of connectivity between the virtual machines and clients thereof (such as other virtual machines). In such a case, transactions between the clients and the virtual machine can be interrupted or even lost. For example, business transactions, such as electronic ordering and financial transactions can be ongoing between the client and the virtual machine. When a virtual machine is migrated, the client may be unaware of the new location of the virtual machine, and may continue to send traffic to the wrong location. After a period of time, the client may be able to realize that connectivity has been lost, and request of the network the proper location of the virtual machine. But, during such a scenario, a transaction can be lost or delayed. In the case of certain network transactions, such as financial trading, loss of such business transactions can be permanent, leading to a loss of revenue to the network operator.

By way of explanation, in FIGS. 7A-7C, processes are illustrated from the point of view of a network authority device one or more program 440, a source network one or more program 441, a destination network one or more program 442, and a remote edge network one or more program 443. In one embodiment, one or more program 440 runs on one or more processor 16 (FIG. 4) of a network authority device 125 (FIG. 5). In one embodiment, one or more program 441 runs on one or more processor 16 (FIG. 4) of a source edge network device 120-1 (FIG. 5). In one embodiment, one or more program 442 runs on one or more processor 16 (FIG. 4) of a remote edge network device 120-3 (FIG. 5). In one embodiment, one or more program 443 runs on one or more processor 16 (FIG. 4) of a remote edge network device 120-2 (FIG. 5). In other embodiments, various programs can run on a different complement of devices. For example, in one embodiment, one or more program 440 and one or more program 441 can both run on source edge network device 120-1 (FIG. 5), which can simultaneously service the source network and provide network authority device functions for the entire network.

FIG. 7A illustrates network communication, including communication between a virtual machine VM1 located on a source network and a virtual machine VM2 located on a remote network. In the embodiment of FIG. 7A, one or more program 441 (e.g., running on a source edge network device 120-1 of FIG. 5) at block 701 notifies network authority device 125 that a virtual machine VM1 is connected to a source network and requests communication with a virtual machine VM2.

In one embodiment, one or more program 440 (e.g., running on a network authority device 125 of FIG. 5) at block 702 installs virtual machine VM1 to a network authority device forwarding table. Next, one or more program 440 at block 703 attempts to locate virtual machineVM2.

In response, one or more program 443 (e.g., running on a remote edge network device 120-2 of FIG. 5) at block 704 notifies the network authority device that virtual machine VM2 is connected to the remote network. In one embodiment, one or more program 440 at block 705 installs virtual machine VM2 to the network authority device forwarding table. Next, one or more program 440 at block 706 notifies the source network that virtual machine VM2 is located on the remote network. Next, one or more program 441 at block 707 installs virtual machine VM2 to a source network forwarding table.

At this stage of the example process of FIG. 7A, in one embodiment, control plane information has been shared by source edge network device 120-1 (FIG. 5) and remote edge network device 120-2 (FIG. 5) with network authority device 125 (FIG. 5).

In one embodiment, one or more program 441 at block 708 sends data from virtual machine VM1 to virtual machine VM2, and one or more program 443 at block 709 receives data for virtual machine VM2 from virtual machine VM1. For example, sending and receiving such data may be through the data plane, not through the control plane.

Continuing with the embodiment of FIG. 7A, one or more program 443 at block 710 notifies the network authority device to request communication with virtual machine VM1.

In response, one or more program 440 at block 711 notifies the remote network that virtual machine VM1 is located on the source network. In one embodiment, one or more program 443 at block 712 installs virtual machine VM1 to a remote network forwarding table. Next, one or more program 443 at block 713 sends data from virtual machine VM2 to virtual machine VM1, and one or more program 441 at block 714 receives data for virtual machine VM1 from virtual machine VM2. For example, sending and receiving such data may be through the data plane, not through the control plane.

In one embodiment, after the process described above, the following forwarding tables are established:

TABLE A

Network Authority Device Forwarding Table

| VNID | VM IP | VM MAC | TEP IP | Age Time |
|------|-------|--------|--------|----------|
| VN_1 | IP_1  | MAC_1  | TEP1   | —        |
| VN_1 | IP_2  | MAC_2  | TEP2   | —        |

TABLE B

Source Edge Network Device Forwarding Table

| VNID | VM IP | VM MAC | TEP IP | Age Time |
|------|-------|--------|--------|----------|
| VN_1 | IP_2  | MAC_2  | TEP2   | —        |

TABLE C

Remote Edge Network Device Forwarding Table

| VNID | VM IP | VM MAC | TEP IP | Age Time |
|------|-------|--------|--------|----------|
| VN_1 | IP_1  | MAC_1  | TEP1   | —        |

By way of explanation, in the forwarding tables above, the columns indicate virtual network identification (VNID), virtual machine (VM) internet protocol IP address and media access control (MAC) address, tunnel endpoint (TEP) IP address, and age time. In addition, the rows each indicate a forwarding table entry. For example, all the entries in the tables above have the same VNID, indicating that the interactions above are denoted for a single virtual network. In a fully operational system, numerous other rows will be present in the various forwarding tables related to other virtual networks and other virtual machines.

FIG. 7B illustrates network communication, including during migration of virtual machine VM1 from the source network to the destination network.

In the embodiment of FIG. 7B, one or more program 442 (e.g., on a destination edge network device 120-3 of FIG. 5) at block 721 notifies the network authority device that virtual machine VM1 is connected to the destination network. In one embodiment, one or more program 440 at block 722 installs virtual machine VM1 to the forwarding table. Next, one or more program 442 at block 723 determines the location of virtual machine VM2 (e.g., resolves the routing information) and sends data from virtual machine VM1 to virtual machine VM2, and one or more program 443 at block 724 receives data for virtual machine VM2 from virtual machine VM1.

Next, one or more program 443 at block 725 sends data from virtual machine VM2 to virtual machine VM1. In such a case, one or more program 441 at block 726 drops the network traffic intended for virtual machine VM1, because virtual machine VM1 has migrated from the source network to the destination network, and the source network simply has no knowledge of the migration, because of the virtual networking paradigm.

Disadvantageously, dropping of network traffic from clients to the virtual machine can interfere with transactions taking place between such clients and the virtual machine. In one embodiment, after a pre-determined time, one or more program 443 at block 727 ages the forwarding table entry for virtual machine VM1. In one embodiment, one or more program 443 at block 728 requests to reestablish communication with virtual machine VM1. For example, the client may be programmed to attempt to re-connect with the virtual machine if connectivity is lost. In such a case, an entirely new session, such as a new TCP/IP session, will need to be established between each and every client of the virtual machine and the virtual machine. Each connection can require each client to re-authenticate and log into the virtual machine, which can increase network traffic and computational requirements of the virtual machine. Indeed, in some case, the remote clients will not be programmed to automatically reconnect, and the connection may be permanently lost.

Next, one or more program 440 at block 729 notifies the remote network edge that virtual machine VM1 is now located on the destination network. Next, one or more program 443 at block 730 installs virtual machine VM1 to the remote network device forwarding table.

In one embodiment, one or more program 443 at block 731 sends data from virtual machine VM2 to virtual machine VM1, and one or more program 442 at block 732 receives data for virtual machine VM1 from virtual machine VM2.

In one embodiment, after the process described above, the following forwarding tables are established:

TABLE D

Network Authority Device Forwarding Table

| VNID | VM IP | VM MAC | TEP IP | Age Time |
|------|-------|--------|--------|----------|
| VN_1 | IP_1  | MAC_1  | TEP3   | —        |
| VN_1 | IP_2  | MAC_2  | TEP2   | —        |

TABLE E

Destination Edge Network Device Forwarding Table

| VNID | VM IP | VM MAC | TEP IP | Age Time |
|---|---|---|---|---|
| VN_1 | IP_2 | MAC_2 | TEP2 | — |

TABLE F

Remote Edge Network Device Forwarding Table

| VNID | VM IP | VM MAC | TEP IP | Age Time |
|---|---|---|---|---|
| VN_1 | IP_1 | MAC_1 | TEP1 | — |

By way of explanation, although the Network Authority Device Forwarding Table (Table D) has been updated to reflect the new location of virtual machine VM1, the Remote Edge Network Device Forwarding Table (Table F) still lists virtual machine VM1 being located on the source network (TEP1) rather than the destination network (TEP3), leading to network traffic being sent from the remote network to the source network, rather than the destination network.

FIG. 7C illustrates network communication, including during migration of virtual machine VM1 from the source network to the destination, in accordance with one or more aspects set forth herein.

For example, one or more program 440 at block 740 updates the source network with information of virtual machine VM1 to redirect network traffic for virtual machine VM1 to the destination network. In one embodiment, the network authority device can update the source edge network (e.g., network device 120-1) to forward the network traffic for virtual machine VM1 to the destination network (e.g., network device 120-3). Next, one or more program 441 at block 741 receives migration information of virtual machine VM1.

In one embodiment, one or more program 443 at block 742 sends data from virtual machine VM2 to virtual machine VM1. In such a case, one or more program 441 at block 743 redirects network traffic for virtual machine VM1 to the destination network. Next, one or more program 442 at block 744 receives network traffic from virtual machine VM2 for virtual machine VM1.

Advantageously, in an embodiment, a network authority device can update the source network concurrent with migrating virtual machine VM1 to minimize and/or eliminate interruption of network traffic from virtual machine VM2 to virtual machine VM1, because once the source network is updated it can begin to redirect the network traffic.

In one embodiment, one or more program 440 at block 745 updates at least one remote network with information of virtual machine VM1. For example, network authority device 125 can update the remote network (e.g., network device 120-2) with information, such as routing information, of virtual machine VM1, which is now located on the destination network. In one specific example, one or more program 440 at block 745 provides the at least one remote network with the migration information of the virtual machine within a pre-determined time interval, where the pre-determined time interval is selected to minimize the redirecting of network traffic by the source network. Advantageously, such an embodiment minimizes the amount of time that the network traffic must be redirected by the source network, thereby restricting the burden on the resources of network devices of the source network to the minimum amount of time (e.g., the pre-determined time interval). For example, the pre-determined time interval can be determined by starting from an arbitrary large time interval, and reducing the time interval based on tracking the amount of time needed to perform updating of the remote network.

Next, one or more program 443 at block 746 receives information of virtual machine VM1, and one or more program 443 at block 747 installs virtual machine VM1 to the remote edge network device forwarding table. Next, one or more program 443 at block 748 sends data from virtual machine VM2 to virtual machine VM1, and one or more program 442 at block 749 receives data for virtual machine VM1 from virtual machine VM2.

In one embodiment, one or more program 441 at block 750 can discontinue redirection of network traffic from virtual machine VM1 to virtual machine VM2. For example, redirection can be discontinued after a pre-determined time interval, to ensure that network traffic is not lost. In another example, the source network can be updated by the network authority device to discontinue redirecting.

In one embodiment, after the process described above, the following forwarding tables are established:

TABLE G

Network Authority Device Forwarding Table

| VNID | VM IP | VM MAC | TEP IP | Age Time |
|---|---|---|---|---|
| VN_1 | IP_1 | MAC_1 | TEP3 | — |
| VN_1 | IP_2 | MAC_2 | TEP2 | — |

TABLE H

Destination Edge Network Device Forwarding Table

| VNID | VM IP | VM MAC | TEP IP | Age Time |
|---|---|---|---|---|
| VN_1 | IP_2 | MAC_2 | TEP2 | — |

TABLE I

Remote Edge Network Device Forwarding Table

| VNID | VM IP | VM MAC | TEP IP | Age Time |
|---|---|---|---|---|
| VN_1 | IP_1 | MAC_1 | TEP3 | — |

By way of explanation, the Remote Edge Network Device Forwarding Table (Table I) has now been updated to list virtual machine VM1 being located on the destination network (TEP3).

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   updating, by one or more processor, a source network with migration information of a virtual machine to redirect network traffic for the virtual machine to a destination network; and
   providing, by the one or more processor, at least one remote network with virtual machine migration information, wherein the providing comprises providing the at least one remote network with the migration information of the virtual machine within a time interval, the time interval selected to reduce redirecting of network traffic by the source network, wherein a plurality of clients of the at least one remote network are currently connected to the virtual machine, and wherein the providing comprises providing migration information to a limited subset of the plurality of clients currently connected to the virtual machine so that clients of the plurality of clients other than the limited subset of the plurality of clients are allowed to drop traffic.

2. The method of claim 1, wherein the updating includes concurrent with a migration and prior to the virtual machine being located on the destination network updating a source edge network device of the source network to forward network traffic for the virtual machine and wherein the method further includes, concurrent with the migration and prior to the virtual machine being located on the destination network, the source edge network device redirecting network traffic for the virtual machine to the destination network.

3. The method of claim 1, wherein the updating includes concurrent with a migration and prior to the virtual machine being located on the destination network updating a source edge network device of the source network to forward network traffic for the virtual machine and wherein the method further includes, concurrent with the migration and prior to the virtual machine being located on the destination network, the source edge network device redirecting network traffic for the virtual machine to the destination network, wherein redirecting by the source edge network device is made active during the migration and prior to the virtual machine being located on the destination network and wherein redirecting is discontinued a predetermined time after redirecting is made active.

4. The method of claim 1, wherein the updating is performed so that concurrent with a migration and prior to the virtual machine being located on the destination network, network traffic from a client of the at least one remote network to the virtual machine is redirected by the source network to a network device of the destination network.

5. The method of claim 1, wherein the updating includes concurrent with a migration updating a source edge network device of the source network to forward network traffic for the virtual machine and wherein the method further includes, concurrent with the migration, the source edge network device redirecting network traffic for the virtual machine to the destination network, wherein redirecting by the source edge network device is made active during the migration and wherein redirecting is discontinued a predetermined time after redirecting is made active, wherein a plurality of clients of the at least one remote network are currently connected to the virtual machine, and wherein the providing comprises providing migration information to a limited subset of clients of the plurality of clients currently connected to the virtual machine so that clients of the limited subset of clients send traffic to the destination network and further so that clients of the plurality of clients other than the limited subset of clients are allowed to drop traffic.

6. The method of claim 1, wherein the updating includes concurrent with a migration updating a source edge network device of the source network to forward network traffic for the virtual machine and wherein the method further includes, concurrent with the migration, the source edge network device redirecting network traffic for the virtual machine to the destination network, wherein redirecting by the source edge network device is made active during the migration and wherein redirecting is discontinued a predetermined time after redirecting is made active, wherein a plurality of clients of the at least one remote network are currently connected to the virtual machine, wherein the providing comprises providing migration information to a limited subset of clients of the plurality of clients currently connected to the virtual machine so that clients of the limited subset of clients send traffic to the destination network and further so that clients of the plurality of clients other than the limited subset of clients are allowed to drop traffic, and wherein the providing comprises providing the at least one remote network with the migration information of the virtual machine within a time interval, the time interval selected to reduce redirecting of network traffic by the source network.

7. The method of claim 1, wherein performing the updating concurrent with a migration of the virtual machine includes performing the updating prior to the virtual machine being located on the destination network.

8. The method of claim 1, wherein a plurality of clients of the at least one remote network are currently connected to and communicating with the virtual machine, and wherein the providing comprises providing virtual machine migration information to a limited subset of the plurality of clients currently connected and to and communicating with the virtual machine, wherein the plurality of the clients currently connected to and communicating with the virtual machine use the provided virtual migration information to maintain connectivity by sending traffic to a proper location of the virtual machine in accordance with the provided virtual machine migration information, wherein clients of the plurality of clients other than the limited subset of the plurality of clients drop traffic by sending traffic to a wrong location of the virtual machine.

9. The method of claim 1, wherein the updating comprises updating a network device of the source network to forward the network traffic for the virtual machine to another network device of the destination network.

10. The method of claim 1, further comprising provisioning, by the one or more processor, the destination network with the migration information of the virtual machine to direct outgoing network traffic from the virtual machine to the at least one remote network.

11. The method of claim 1, wherein the updating comprises updating a network device of the source network with routing information.

12. The method of claim 1, wherein the providing comprises providing a network device of the remote network with routing information.

13. The method of claim 1, wherein the limited subset of the plurality of the clients currently connected to and communicating with the virtual machine use the provided virtual migration information to maintain connectivity with the virtual machine by sending traffic to a proper location of the virtual machine in accordance with the provided virtual machine migration information.

14. The method of claim 1, wherein a plurality of clients of the at least one remote network are currently connected to and communicating with the virtual machine, and wherein the providing comprises providing virtual machine migration information to a limited subset of the plurality of clients currently connected to and to and communicating with the virtual machine, wherein the limited subset of the plurality of the clients currently connected to and communicating with the virtual machine use the provided virtual migration information to maintain connectivity with the virtual machine during a migration of the virtual machine by sending traffic to a proper location of the virtual machine in accordance with the provided virtual machine migration information, wherein clients of the plurality of clients other than the limited subset of the plurality of clients drop traffic by sending traffic to a wrong location of the virtual machine.

15. A system comprising:
a memory;
one or more processor in communication with the memory; and
instructions executable by the one or more processor to perform a method, the method comprising:
updating, by the one or more processor, a source network with migration information of a virtual machine to redirect network traffic for the virtual machine to a destination network; and
providing, by the one or more processor, at least one remote network with virtual machine migration information, wherein the providing comprises providing the at least one remote network with the migration information of the virtual machine within a time interval, the time interval selected to reduce redirecting of network traffic by the source network, wherein a plurality of clients of the at least one remote network are currently connected to the virtual machine, and wherein the providing comprises providing migration information to a limited subset of the plurality of clients currently connected to the virtual machine so that clients of the plurality of clients other than the limited subset of the plurality of clients are allowed to drop traffic.

16. The system of claim 15, wherein performing the updating concurrent with a migration of the virtual machine includes performing the updating prior to the virtual machine being located on the destination network.

17. The system of claim 15, wherein the updating comprises updating a network device of the source network to forward the network traffic for the virtual machine to another network device of the destination network.

18. The system of claim 15, further comprising provisioning, by the one or more processor, the destination network with the migration information of the virtual machine to direct outgoing network traffic from the virtual machine to the at least one remote network.

19. The system of claim 15, wherein the updating comprises updating a network device of the source network with routing information.

20. A computer program product comprising:
a computer readable storage medium readable by one or more processing circuit and storing instructions for execution by one or more processor for performing a method comprising:
updating, by one or more processor, a source network with migration information of a virtual machine to redirect network traffic for the virtual machine to a destination network; and
providing, by the one or more processor, at least one remote network with virtual machine migration information, wherein the providing comprises providing the at least one remote network with the migration information of the virtual machine within a time interval, the time interval selected to reduce redirecting of network traffic by the source network, wherein a plurality of clients of the at least one remote network are currently connected to the virtual machine, and wherein the providing comprises providing migration information to a limited subset of the plurality of clients currently connected to the virtual machine so that clients of the plurality of clients other than the limited subset of the plurality of clients are allowed to drop traffic.

* * * * *